3,823,102
MIXTURES OF POLYURETHANE OR POLYUREAS, NITROCELLULOSE AND UREA DERIVATIVES FOR DRESSING NATURAL AND ARTIFICIAL LEATHER

Johannes Eimer, Leverkusen, Walter Schroer, Cologne, and Erwin Windemuth and Peter Coppee, Leverkusen, Germany, assignors to Bayer Aktiengesellschaft, Leverkusen, Germany
No Drawing. Filed Oct. 31, 1972, Ser. No. 302,628
Claims priority, application Germany, Nov. 9, 1971, P 21 55 491.6
Int. Cl. C08b 21/14
U.S. Cl. 260—16                                  2 Claims

ABSTRACT OF THE DISCLOSURE

Textile coatings and leather dressing composition are provided which compositions comprise mixtures of polyurethanes or polyureas with nitrocellulose and a urea derivative which contains at least one saturated or unsaturated aliphatic radical containing from 8 to 20 carbon atoms and at least one urea group.

---

Textile coatings and leather dressing compositions based on polyurethanes and/or polyureas are well-known. Reaction products of solutions of polyesters or polyester urethanes with polyisocyanates may be used, for example, in the manufacture of patent leather.

When higher molecular weight polyurethanes are used in solution for coating either untreated or primed leather, the finished coating is not very glossy owing to the low solids content of the solution and generally has a sticky, rubber-like handle, adheres poorly to the substrate and has insufficient abrasion resistance at elevated temperatures. Solutions of higher molecular weight polyurethanes in solvents such as esters and ketones also cause difficulties when sprayed on leather because of their tendency to form threads and the evenness of the coatings is therefore unsatisfactory.

When highly soluble low molecular weight polyurethanes are applied to leather in the form of concentrated solutions, the cross-linking reaction with the isocyanate hardeners is so slow that it requires several hours before the leather is sufficiently dry to be stacked.

The addition of nitrocellulose to these polyurethane solutions is also known and is described for example, in German Pat. 870,479. Although this considerably reduces the drying time and results in a drier handle and improved evenness, it reduces the flexibility and elasticity of the films.

Since a completely satisfactory handle generally cannot be obtained with the above mentioned polyurethane and/or polyurea dressings even when nitrocellulose is added, long-chained compounds such as, for example, stearyl alcohol, stearylamine or stearylamide are frequently used to improve the handle. These additives though imparting a very smooth feel to the leather dressings also reduce their gloss. Moreover, these additives frequently show an undesirable tendency to migrate, due to their incompatability with the polyurethane and/or polyurea or nitrocellulose, and as a result, the film becomes cloudy and undesirable surface effects are produced. Another disadvantage of using these long-chained amines or amides is that they cause discoloration of the nitrocellulose in the dressings so that the coatings are not fast to light.

It is therefore an object of this invention to provide textile coatings and leather dressing compositions devoid of the foregoing disadvantages. Further objects of this invention are to provide textile coatings and leather dressing compositions having high gloss, good light fastness and excellent handle. The foregoing objects and others which will become apparent from the following description are accomplished in accordance with the invention, generally speaking, providing a composition comprising a mixture of polyurethanes or polyureas, nitrocellulose and compounds which contain at least one urea group and at least one aliphatic radical containing from 8 to 20 carbon atoms, preferably a $C_8$ to $C_{20}$ alkyl group, in the molecule.

More specifically, the compositions of the invention comprise reaction products of polyisocyanates with compounds having a molecular weight of from about 1000 to about 200,000 which contain terminal hydroxyl or amino groups, nitrocellulose and urea derivatives of the general formula:

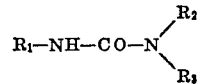

wherein $R_1$ is a linear or branched, saturated or unsaturated aliphatic radical containing from 8 to 20 carbon atoms in the chain; and $R_2$ and $R_3$ are hydrogen or a linear or branched, saturated or unsaturated aliphatic, araliphatic, aromatic or hydroaromatic radical which may contain hetero atoms, such as oxygen or sulphur.

The urea derivatives of the given general structure may be prepared by reacting mono- or disubstituted amines of the general formula:

with monoisocyanates of the general formula:

wherein $R_1$, $R_2$ and $R_3$ are as defined hereinabove.

The urea derivatives may be, for example, reaction products of methylamine, butylamine, allylamine, cyclohexylamine, benzylamine, piperidine, morpholine, methylbenzylamine, monoethanolamine, diethanolamine, monoisopropanolamine, diisopropanolamine, monoisobutanolamine or diisobutanolamine and the like with isocyanates such as, for example, decyl-, tetradecyl-, hexadecyl-, stearyl- or oleyl-isocyanates and the like.

The urea compounds are generally dissolved in inert organic solvents such as, for example, esters, ketones, aromatic and cycloaliphatic hydrocarbons and chlorinated hydrocarbons used commercially as solvents, and added to the coating compositions. The urea compounds are used in quantities of from 0.5 to about 25 percent, preferably from about 3 to about 15 percent based on the solids content of the coating or dressing composition.

The reaction products of polyisocyanates and compounds having molecular weights of from about 1000 to about 200,000 and which contain terminal hydroxyl or amino groups used according to the invention are prepared by the known methods of polyurethane chemistry by reacting the higher molecular weight compounds which contain terminal hydroxyl or amino groups with polyisocyanates, if desired, in the presence of low molecular weight chain-lengthening agents. The proportions of reactants may be selected such that polyaddition products which contain terminal hydroxyl or amino groups are obtained or they may be selected to yield polyaddition products having terminal isocyanate groups. According to the invention, the polyadducts used may either contain terminal hydroxyl or amino groups and have molecular weights of from about 1000 to about 200,000, in particular from about 15,000 to about 80,000, or they may have terminal isocyanate groups and molecular weights of from about 1000 to about 50,000, in particular from about 2000 to about 20,000.

Any compounds in the molecular weight range of from about 500 to about 20,000, in particular from about 1000 to about 3000, which contain at least two terminal hydroxyl or amino groups may be used for the preparation of the polyurethanes or polyureas. Some examples of such compounds are polyesters, polyester amines, polyethers, polythioethers and polyacetals all of which are well known in polyurethane chemistry which may contain urethane groups, and polysiloxanes which contain terminal hydroxyl or amino groups. Polyesters of aliphatic diols and aliphatic dicarboxylic acids are preferred, for example, the polyesters of adipic acid and a glycol such as ethylene glycol, diethylene glycol, hexamethylene diol or 2,2-dimethylpropane-1,3-diol and the like.

The polyisocyanate components are also known polyisocyanates commonly used in the polyurethane art such as, for example, tolylene diisocyanates, 4,4'-diisocyanatodiphenylmethane, hexamethylene diisocyanate, 3-isocyanatomethyl - 3,5,5 - trimethylcyclohexyl isocyanate, etc. The chain-lengthening agents with a molecular weight below 500 which may be optionally used may be any compounds which have at least two hydroxyl or amino groups. Some preferred chain-lengthening agents are ethylene glycol, diethylene glycol, tetramethylene diol, hexamethylene diol as well as higher functional alcohols such as trimethylolpropane or hexane triol.

The nitrocelluloses used may be either ester soluble commercial nitrocelluloses, for example, 3 to 33% solutions in 98 to 100% butyl acetate having a viscosity of about 5000 cp., or any alcoholic nitrocelluloses, for example, 7 to 28% solutions in 92 to 94% ethanol and benzene in the ratio of 1:1 having a viscosity of 5000 cp. The plasticizers present in commercial nitrocellulose chips have no deleterious effect.

Additional polyisocyanates which may be used are well known polyisocyanates commonly used in polyurethane chemistry, especially those which have a low vapor pressure, for example, the dimerization and trimerization products of polyfunctional aliphatic and/or aromatic isocyanates such as tolylene diisocyanate or a mixture of tolylene diisocyanate and hexamethylene diisocyanate or the addition product of 3 mols of tolylene-2,4-diisocyanate and one mol of trimethylolpropane, tri(4-isocyanatophenyl)thiophosphoric acid esters, the biuret triisocyanate obtainable from hexamethylene diisocyanate and water or commercial polyisocyanate mixtures which may be obtained by phosgenating aniline-formaldehyde condensates.

Suitable auxiliary agents such as catalysts, for example, tertiary amines or lead or tin compounds and the like, which accelerate the NCO/OH reaction, fillers which improve the gloss, for example, silicic acid, aluminium silicate, talcum, kieselgur or the metal salts of fatty acids and the like, or the usual additives which improve the flow, wetting properties and adherence may also be added.

Particularly suitable solvents for leather dressings are any solvents which are free from groups which are reactive with isocyanate groups, for example, acetone, methylethyl ketone, methylisobutyl ketone, diisobutyl ketone, tetrahydrofurane, ethyl acetate, butyl acetate, methyl or ethyl glycol acetate, dimethyl formamide, methylene-, ethylene- or propylene chloride, aromatic hydrocarbons and the like. If no isocyanate groups are present in the reaction mixture, solvents which contain hydroxyl groups, for example, isopropanol or ethanol, may also be used. The quantity of solvent used is generally chosen such that the solutions can be stirred and has no tendency to form gel lumps. The "solutions" used here are preferably liquid organic systems which contain colloidal constituents and in which insoluble components, for example, fillers and the like may also be dispersed. Cloudiness may occasionally occur even if no insoluble components are present, but this has no harmful effect on the advantageous properties of the dressing.

The compositions according to the invention generally contain from about 8 to about 95% by weight of the reaction products of polyisocyanates and compounds with molecular weights of from about 1000 to about 200,000 which contain terminal hydroxyl or amino groups, from about 3 to about 90% by weight of nitrocellulose and from about 0.5 to about 25% by weight of the urea derivatives specified, based on the total weight of the said three components.

The handle of the coatings obtained from the compositions according to the invention may be modified if desired by the addition of any natural, semi-synthetic or synthetic low-molecular weight or high-molecular weight compounds such as polyvinyl chloride copolymers, caprolactam, natural or synthetic waxes, natural resins, polymers which are soluble in organic solvents, silicone oils or alcohols with a long hydrocarbon chain of 8 to 20 carbon atoms. The flow, wetting properties and adherence of the coatings may also be improved by adjusting the degree of dilution, by adding wetting agents which are soluble in organic solvents, for example, silicone oils, and by suitably selecting the solvents with regard to their dissolving power, boiling point and rate of evaporation. The dressings are applied by the usual methods of application employed for substances dissolved in organic solvents, using air spray guns, airless spray guns, casting apparatus, applicator rollers or wiper applicators and the like. They may also be applied by the reversal process. The smoothness and finish of the leather may be improved by pressing it between applications and after the final application, using rotary or hydraulic presses at the usual temperatures employed with such apparatus. The individual applications may be dried at normal or elevated temperatures of up to about 150° C. in drying chambers or drying channels. The amount of dressing applied with each coating is normally between 5 and 50 g. per m.$^2$, depending on the absorbency of the leather and the effect desired.

The compositions of the invention are eminently suitable for dressing both natural and artificial leathers and may also be used to prepare artificial leathers by application to textile substrates.

The invention is further illustrated but is not intended that it be limited by the following examples in which all parts and percentages are by weight unless otherwise specified.

EXAMPLES

Example 1

A chrome-tanned cow hide or calf grain leather which is pre-dyed in the vat with aniline dye is primed with a primer composition of 150 parts of a commercial polymer dispersion used for leather dressings, containing about 40% of a copolymer of butadiene and acrylonitrile,
30 parts by weight of a commercial plasticized casein gloss; and
820 parts by weight of water.

The primer is applied with plush rollers. The following dressing composition is applied to the primed aniline leather by spraying:

66 parts of a 30% ethyl acetate solution of a polyurethane prepared from 50 parts of an adipic acid/ethylene glycol polyester with hydroxyl number 56; 50 parts by weight of an adipic acid diethylene glycol polyester with hydroxyl number 45; and 7.8 parts of a mixture of tolylene - 2,4 - diisocyanate and tolylene - 2,6 - diisocyanate, in which the ratio of isomers is 65:35;
75 parts of a 10% solution in butyl acetate of a commercial ester-soluble nitrocellulose, a 6% solution of which in 98% butyl acetate has a viscosity of 5000 cp.;

50 parts of a 10% solution in ethyl acetate of an N-cetyl-N',N'-dibutyl urea prepared from 1 mol of cetyl isocyanate and 1 mol of dibutylamine;

20 parts of a 60% solution in butyl acetate of a mixed polyadduct which is prepared from 1 mol of hexamethylene diisocyanate and 2 mols of tolylene diisocyanate and which has an NCO-content of 10.2%; and 789 parts of ethyl acetate and ethyl glycol acetate in the ratio of 1:1.

A very full-bodied, lightfast coating which has a pleasant, smooth handle and silky gloss is obtained after a maximum of 10 minutes drying. Dressings prepared without the addition of the urea component are greatly reduced in their fullness and slightly reduced in gloss and have a slightly sticky handle and are not ready to be stacked even after 30 minutes.

Example 2

An aniline leather primed as described in Example 1 is treated with the following dressing applied by spraying:

100 parts of a 15% solution in a mixture of equal parts of methyl ethyl ketone and ethyl acetate of a polyurethane prepared from 100 parts of an adipic acid/butane - 1,4 - diol polyester with hydroxyl number 51 and 7.85 parts of tolylene-2,4- and -2,6-diisocyanate with the isomeric ratio of 65:35;

100 parts of a solution of collodion in butyl acetate which has a solids content of 10% consisting of ester-soluble nitrocellulose whose 18% solution in 98% butyl acetate has a viscosity of 5000 cp.;

25 parts of a 20% paste in xylene of N-stearyl-N',N'-bis-(2-hydroxyethyl)urea prepared from 1 mol of stearyl isocyanate and 1 mol of diethanolamine;

15 parts of a 60% solution in butyl acetate of the polyisocyanate specified in Example 1; and 760 parts of a mixture of equal parts of ethyl acetate and ethyl glycol acetate.

A soft, supple, full-bodied, lightfast leather which can easily be stacked after only 5 minutes drying is obtained. Leather dressings prepared without the urea additive produce a less well covered and slightly less glossy finish, have a plastics-like handle and are not sufficiently dry for stacking unless dried for at least 20 minutes.

Example 3

A dressing of the following composition is applied to an aniline leather which is pre-treated as described in Example 1:

100 parts of a 20% solution in equal parts of ethyl acetate and methyl ethyl ketone of a polyurethane prepared from 100 parts of a polyester of adipic acid and diethylene glycol and 6.4 parts of hexamethylene diisocyanate;

100 parts of a 10% solution in butyl acetate of a collodion whose 14% solution in 98-100% butyl acetate has a viscosity of 5000 cp.;

30 parts of a 10% solution in methyl ethyl ketone of an N-stearyl-N',N'-bis - (2 - hydroxypropyl) urea prepared by reacting 1 mol of stearyl isocyanate with 1 mol of diisopropanolamine;

20 parts of a 75% solution in ethyl acetate of a triisocyanate prepared from 1 mol of trimethylolpropane and 3 mols of tolylene diisocyanate; and 750 parts of a mixture of equal parts of ethyl acetate and ethyl glycol acetate.

The leather obtained by this treatment has a smooth, supple and full-bodied handle and can be stacked after 15 minutes drying. Without the addition of the urea component, the leather is slightly sticky, less full and slightly less glossy and can only be stacked after 1 to 2 hours.

Although the invention is illustrated in considerable detail in the foregoing examples, it is to be understood that such examples are presented solely for purposes of illustration and that many variations may be made by those skilled in the art without departing from the spirit and scope of the invention.

What is claimed is:

1. A composition comprising the reaction product of polyisocyanates with compounds having a molecular weight of from about 1000 to about 200,000; said compounds containing at least two terminal hydroxyl or amino groups, nitrocellulose and an urea derivative of the general formula

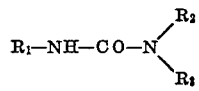

wherein $R_1$ is a saturated or unsaturated aliphatic radical containing from 8 to 20 carbon atoms in the chain; $R_2$ and $R_3$ are hydrogen, aliphatic, araliphatic, aromatic or hydroaromatic radicals which may contain hetero atoms of oxygen or sulphur, said composition comprising from about 8 to about 95 percent by weight of the reaction product of polyisocyanates and active hydrogen containing compounds, from about 3 to about 90 percent by weight of nitrocellulose and from about 0.5 to about 25 percent by weight of urea derivative.

2. The composition of claim 1 wherein the urea derivative contains at least one $C_8$ to $C_{20}$ alkyl group and at least one urea group.

References Cited

UNITED STATES PATENTS

| | | | |
|---|---|---|---|
| 2,948,691 | 8/1960 | Windemuth et al. | 260—13 |
| 3,522,304 | 7/1970 | Vogt | 260—77.5 |
| 3,678,011 | 7/1972 | Hino et al. | 260—75 |
| 3,691,117 | 9/1972 | Messerly | 117—161 |

WILLIAM H. SHORT, Primary Examiner

E. WOODBERRY, Assistant Examiner

U.S. Cl. X.R.

117—142, 161 C, KP; 260—13